United States Patent
Kalarical et al.

(10) Patent No.: US 7,279,036 B2
(45) Date of Patent: Oct. 9, 2007

(54) PROCESS FOR PREPARATION OF INORGANIC COLORANTS FROM MIXED RARE EARTH COMPOUNDS

(75) Inventors: Janardhanan Sreeram Kalarical, Chennai (IN); Balachandran Unni Nair, Chennai (IN); Ramasami Thirumalachari, Chennai (IN)

(73) Assignee: Council of Scientific and Industrial Research, New Delhi (IN)

( * ) Notice: Subject to any disclaimer, the term of this patent is extended or adjusted under 35 U.S.C. 154(b) by 361 days.

(21) Appl. No.: 11/021,566

(22) Filed: Dec. 23, 2004

(65) Prior Publication Data

US 2006/0140830 A1 Jun. 29, 2006

(51) Int. Cl.
*C04B 14/00* (2006.01)

(52) U.S. Cl. ............... 106/400; 423/21.1; 502/65; 252/509; 75/610

(58) Field of Classification Search .......... 106/400; 423/21.1; 502/65; 252/509; 75/610
See application file for complete search history.

(56) References Cited

U.S. PATENT DOCUMENTS

| | | | | |
|---|---|---|---|---|
| 3,748,095 | A * | 7/1973 | Henderson et al. | 423/21.1 |
| 4,545,967 | A * | 10/1985 | Reynolds et al. | 423/263 |
| 4,786,325 | A * | 11/1988 | Melard et al. | 106/3 |
| 5,348,581 | A * | 9/1994 | Chopin et al. | 106/461 |
| 5,401,309 | A * | 3/1995 | Chopin et al. | 106/461 |
| 5,688,316 | A * | 11/1997 | Pettini et al. | 106/461 |
| 5,755,868 | A * | 5/1998 | Macaudiere | 106/401 |
| 5,931,998 | A * | 8/1999 | Tourangeau | 106/414 |
| 5,968,247 | A * | 10/1999 | Macaudiere | 106/401 |
| 6,419,735 | B1 * | 7/2002 | Busnot et al. | 106/401 |
| 2002/0034644 | A1 * | 3/2002 | Swiler et al. | 428/432 |
| 2002/0081243 | A1 * | 6/2002 | He | 422/177 |
| 2005/0103230 | A1 * | 5/2005 | Baldi et al. | 106/431 |

\* cited by examiner

*Primary Examiner*—J. A. Orengo
*Assistant Examiner*—Shuangyi Abu-Ali
(74) *Attorney, Agent, or Firm*—Ladas and Parry LLP

(57) ABSTRACT

The present invention provides a novel process for preparation of inorganic colourants from mixed rare earth compounds, which are directly obtained from the ore industry, without undergoing any separation, thereby enabling a cost reduction to the extend of 10-100 times. Colors ranging from brown, blue and green can be obtained by suitable doping with other metal ions.

8 Claims, No Drawings

PROCESS FOR PREPARATION OF INORGANIC COLORANTS FROM MIXED RARE EARTH COMPOUNDS

FIELD OF THE INVENTION

The present invention relates to a process for the preparation of inorganic colourants from mixed rare earth compounds. More particularly, the present invention provides a process for preparation of inorganic colourants from mixed rare earth compounds without separating individual rare earth elements present therein. The invention has enormous application in colourant industry to manufacture environment friendly, non-carcinogenic and cost effective colorant. The process also provides an economical option to the ore industry to use the mixed rare earth compounds for producing environmentally safe colorants.

BACKGROUND OF THE INVENTION

Inorganic colorants contain various types of metal ions in the form of carbonates, sulfides and oxides. The nature of the metal ion plays a vital role in the color of the colorant. Several colorants conventionally used in the paint industry are toxic. These include barium chromate, cadmium sulfide, lead antimoniate etc. Regulations in Europe concerning the protection of the environment have forced the paint industry to invest heavily in research programs on development of inorganic paints that are free of heavy metals such as lead, mercury, cadmium, antimony, arsenic, chromium, selenium etc. Rare earth elements offer a vast opportunity for development of environmentally secure alternatives for many of the eco-constrained colorants. Their unique electronic configuration of partially filled f orbitals result in unusual magnetic and optical properties. The color developed depends on the number of unpaired electrons. The rare earth elements derive their color from charge transfer electronic transitions. As reported by Maestro et al (Journal of Alloys and Compounds, Vol. 225, p. 520, 1995), the preparation of colorants based on rare earth elements has been based on the use of individual rare elements as their oxides, sulfides and phosphates. As reported by Lee (Concise Inorganic Chemistry, 4$^{th}$ Edition, ELBS publication, p. 864, 1991), the separation of one rare earth element from another is an exceedingly difficult task, almost as difficult as the separation of isotopes of one element. This is due to the similarities in size and charge of the rare earth elements. This results in high cost of obtaining individual rare earth elements, and hence only a fewer rare earth based colorants are industrially available, with most of them as phosphors and luminescent colorants. As reported by Pan et al (Journal of Solid State Chemistry, Vol. 174, p. 69, 2003), Lanthanide-doped nanocrystalline oxides with particle diameters of 100 nm or less have been drawing particular interest as phosphors. Ravilsetty P Rao (U.S. Pat. No. 5,989,454, 1999) has described a method for making small particle blue emitting lanthanum phosphate based phosphors. The importance of donor- and acceptor-like charge transfer processes in the luminescence properties of rare earth doped crystalline solids have become increasingly evident. As reported by Yen et al (Journal of Luminescence, Vol. 69, p. 287, 1996), small, but crucial, differences in the relative position of the orbitals can result either in complete quenching of the emission or in luminescence with quantum efficiencies close to unity. The favorable influence of the use of oxides of rare earths for the preparation of red, blue and green phosphors is now known. In these preparations a relatively high level of purity of the rare earth compounds remains crucial. Mixed metal compounds with exact ratios of binary or tertiary systems are known to provide red ($Y_{2-x}Eu_xO_3$) or green ($La_{1-x-y}Ce_xTb_yPO_4$) phosphors, where x and y are integers.

Some rare earth oxides are being widely used in ceramic industry to produce colors. Sulcova et al (Dyes and Pigments, vol. 40, p87, 1998 and Dyes and Pigments, vol. 47, p285, 2000) have employed cerium oxide to develop an opaque white color and by doping cerium with praseodymium, neodymium, yttrium the other different shades like yellow, violet, orange and burgundy have been obtained.

Sulcova (Dyes and Pigments, vol. 47, p285, 2000) has reported that colorants of the formula $Ce_{0.95-y}Pr_{0.05}Nd_yO_{2-0.5y}$ prepared by high temperature calcinations of cerium, praseodymium and neodymium oxides have a reddish hue, where y=0.05, 0.15, 0.25, 0.35, 0.45, 0.55, 0.65, 0.75, 0.85. Gonzalvo et al (Journal of Alloy Compounds., vol. 323-324, p. 372, 2001) have reported that colored oxides of the type $Bi_2O_3$—$R_2O_3$ can serve as ecological inorganic colorants. Doping of alkali or alkaline earth metals with cerium results in good colorants. Swiler et al (U.S. Pat. No. 6,582,814, 2003) have reported that rare earth-transition metal oxide, preferably of the formula ($Re_xTm)O_y$, where Re is at least one rare earth element, Tm is at least one transition metal, x ranges from 0.08 to 12, and y ranges from x+1 to 2x+2 are useful as colorants, and possess good stability. Jansen et al (Nature, vol. 404, p. 980, 2000) have reported that calcium, lanthanum, tantalum oxynitrides provide for colors ranging from yellow to red.

In these colorants, the ratio of R (the rare earth ion) becomes increasingly relevant with the color being dependent on the type of rare earth oxide used. However, because of the close similarities in the chemical properties of the rare earth ions, separations are difficult and lead to higher costs of purified rare earth based compounds.

There is no prior information available on the use of mixed rare earth compounds (without separation as individual rare earth compounds) by suitable combination with other metal ions. Such an approach gains significance.

OBJECTS OF THE INVENTION

The main objective of the present invention is to provide a novel process for the preparation of inorganic colourants from mixed rare earth compounds, which obviates the limitations as stated above.

Another objective of the present invention is to provide for an environmentally safe inorganic colorant whereby the use of harmful metal ions likes lead, chromium, cadmium, mercury etc are avoided.

Yet another objective of the present invention is to bring about charge transfer interactions and conduction band energy transfer interactions between the mixed rare earth compound and one or more metal ion.

Still another objective of the present invention is to provide for a range of colors by employing mixed rare earth compounds either as dopant or co-dopant

SUMMARY OF THE INVENTION

Accordingly, the present invention provides a novel process for the preparation of inorganic colourants from mixed rare earth compounds, which comprises
i) homogenising mixed rare earth compounds selected from one or more of oxide, carbonate, nitrate, fluoride, chloride of rare earth elements having atomic number in the range of 57 to 71 and having a composition of at least Cerium in the range of 40-45% w/w, Praseodymium in the range of 4-6% w/w, Lanthanum in the range of 15-25%, Neodymium in the range of 15-20% and other rare earths to a maximum of 5%, optionally mixed with not more than 40 times by weight of a compound of a metal ion selected from the group consisting of transition metal series, lanthanide/actinide series, group(III) or group(IV) of the periodic table, and/or not more than 0.2 times by weight of neutral salt either in liquid phase or solid state to obtain a homogenate;

ii) heating the homogenate obtained in step (i), followed by cooling and subsequent reduction of particle size of the resulting product to obtain inorganic colourants.

In one embodiment of the invention, the homogenate is heated in step (ii) to a temperature in the range of 600-1800° C. for a period of 10-600 minutes either continuously or with intermittent sintering.

In another embodiment of the invention, the cooling in step (ii) is carried out to a temperature in the range of 35-150° C.

In yet another embodiment of the invention, the particle size in step (ii) is reduced to not more than 100 microns.

In another embodiment of the invention, the rare earth element present in the mixed rare earth compound is selected from the group consisting of lanthanum, samarium, neodymium, terbium and any combination thereof.

In another embodiment of the invention, the metal is selected from the group consisting of Nickel, Cobalt, Titanium, Zirconium, Aluminium, Silcon, Germanium, Thalium and any combination thereof.

In another embodiment of the invention, the neutral salt used is selected from the group consisting of chloride, fluoride, phosphate and sulfate salts of sodium either individually or in any combination thereof.

In another embodiment of the invention, the reduction of particle size is effected using a ball mill, grinder, crusher, attrition mill or mortar and pestle.

DETAILED DESCRIPTION OF THE INVENTION

The present invention provides a novel process for the preparation of inorganic colourants from mixed rare earth compounds. The process comprises (i) homogenising mixed rare earth compounds selected from one or more of oxide, carbonate, nitrate, fluoride, chloride of rare earth elements having atomic number in the range of 57 to 71 and having a composition of at least Cerium in the range of 40-45% w/w, Praseodymium in the range of 4-6% w/w, Lanthanum in the range of 15-25%, Neodymium in the range of 15-20% and other rare earths to a maximum of 5%, optionally mixed with not more than 40 times by weight of a compound of a metal ion selected from the group consisting of transition metal series, lanthanide/actinide series, group(III) or group(IV) of the periodic table, and/or not more than 0.2 times by weight of neutral salt either in liquid phase or solid state to obtain a homogenate;

iii) heating the homogenate obtained in step (i), followed by cooling and subsequent reduction of particle size of the resulting product to obtain inorganic colourants.

The homogenate is heated in step (ii) to a temperature in the range of 600-1800° C. for a period of 10-600 minutes either continuously or with intermittent sintering and the cooling is carried out to a temperature in the range of 35-150° C. The particle size in step (ii) is reduced to not more than 100 microns.

The rare earth element present in the mixed rare earth compound is selected from the group consisting of lanthanum, samarium, neodymium, terbium and any combination thereof The metal is selected from the group consisting of Nickel, Cobalt, Titanium, Zirconium, Aluminium, Silcon, Germanium, Thalium and any combination thereof. The neutral salt used is selected from the group consisting of chloride, fluoride, phosphate and sulfate salts of sodium either individually or in any combination thereof The reduction of particle size is effected using a ball mill, grinder, crusher, attrition mill or mortar and pestle.

The process of the present invention is described below in detail.

Mixed rare earth compound, selected from one or more among but not limited to oxide, carbonate, nitrate, fluoride, chloride of rare earth element and having a composition of at least Cerium in the range of 40-45% w/w, Praseodymium in the range of 4-6% w/w, Lanthanum in the range of 15-25%, Neodymium in the range of 15-20% and other rare earths to a maximum of 5%, optionally mixed with not more than 40 times by weight of a compound of a metal ion selected from transition metal series, lanthanide/actinide series, group(III) or group(IV) of the periodic table, and/or not more than 0.2 times by weight of neutral salt is homogenised either in liquid phase or solid state by known method. The resulting homogenate is heated to a temperature in the range of 600-1800° C. either continuously or with intermittent sintering. After a period of 10-600 mins the resulting mixture is allowed to cool down to a temperature in the range of 35-150° C. and the product is subjected to the reduction of particle size at a range of 1-100 microns by known method to obtain inorganic colourants.

The colour values are measured on the CIE scale (The CIE is short for Commission International de l'Eclairage which is the French title of the international commission on light), represented by L $a^*$ $b^*$. The L-axis is known as the lightness and extends from 0 (black) to 100 (white). The other two coordinates $a^*$ and $b^*$ represent redness-greeness and yellowness-blueness respectively. Samples for which $a^*=b^*=0$ are achromatic and thus the L-axis represents the achromatic scale of greys from black to white.

The inventive step of the present invention lies in the use of the mixed rare earth compound as such, without subjecting the same to any separation for any specific element for subsequent compounding for colouration, thereby reducing the cost of the raw material for the production of the colourants.

The invention is described in detail in the following illustrative examples, which should not be construed to limit the scope of the present invention.

EXAMPLE 1

1 g of mixed rare earth carbonate is taken in a mortar and ground using a pestle. The homogeneous mixture is then heated at a rate of 3° C./min to a temperature of 1000° C. for 4 hrs in a refractory furnace in the presence of atmospheric oxygen. The heated mixture is then cooled to 35° C., ground to particle size of 100 microns in a mortar and pestle to obtain brown colored inorganic colorants. The obtained colorant had L $a^*$ $b^*$ values of 45.39, 16.91 and 20.06 respectively on the CIE scale.

EXAMPLE 2

1 g of mixed rare earth carbonate was mixed with 0.1 g of copper(II)sulfate and 0.05 g of sodium phosphate and the resultant mixture was ground to achieve a homogeneous mixture. This mixture was then heated at 1300° C. for 2 hrs in a refractory furnace in the presence of atmospheric oxygen. The rate of heating was maintained at 5° C./min. The heated mixture was then cooled to 80° C., ground in a crusher to reduce its particle size to 75 microns. The obtained colorant had L a* b* values of 52.09, 11.15 and 21.06 respectively on the CIE scale.

EXAMPLE 3

1 g of mixed rare earth carbonate was mixed with 0.1 g of vanadyl sulfate and 0.05 g of sodium phosphate and the resultant mixture was ground to achieve a homogeneous mixture. This mixture was then heated at 1300° C. for 2 hrs in a refractory furnace in the presence of atmospheric oxygen. The rate of heating was maintained at 5° C./min. The heated mixture was then cooled to 50° C., ground in an attrition mill to reduce its particle size to 75 microns. The obtained colorant had L a* b* values of 52.13, 13.33, 16.94 respectively on the CIE scale.

EXAMPLE 4

1 g of mixed rare earth carbonate was mixed with 0.1 g of nickel sulfate and 0.05 g of sodium phosphate and the resultant mixture was ground to achieve a homogeneous mixture. This mixture was then heated at 1300° C. for 2 hrs in a refractory furnace in the presence of atmospheric oxygen. The rate of heating was maintained at 5° C./min. The heated mixture was then cooled to 50° C., ground in a ball mill to reduce its particle size to 75 microns. The obtained colorant had L a* b* values of 41.06, 13.13 and 21.47 respectively on the CIE scale.

EXAMPLE 5

1 g of mixed rare earth carbonate was mixed with 0.1 g of praseodymium oxide and the resultant mixture was ground to achieve a homogeneous mixture. This mixture was then heated at 1300° C. for 2 hrs in a refractory furnace in the presence of atmospheric oxygen. The rate of heating was maintained at 2° C./min. The heated mixture was then cooled to 50° C., ground in a crusher to reduce its particle size to 75 microns. The obtained colorant had L a* b* values of 35.73, 13.43 and 13.88 respectively on the CIE scale.

EXAMPLE 6

0.3 g of mixed rare earth carbonate was mixed with 1 g of alumina and 0.1 g of sodium nitrate and the resultant mixture was ground to achieve a homogeneous mixture. This mixture was then heated at 1300° C. for 2 hrs in a refractory furnace in the presence of atmospheric oxygen. The rate of heating was maintained at 4° C./min. The heated mixture was then cooled to 50° C., ground in a ball mill to reduce its particle size to 75 microns. The obtained colorant had L a* b* values of 76.35, 7.14 and 12.91 respectively on the CIE scale.

EXAMPLE 7

0.1 g of mixed rare earth carbonate was mixed with 1 g of alumina and 0.3 g of nickel sulfate and the resultant mixture was ground to achieve a homogeneous mixture. This mixture was then heated at 1300° C. for 2 hrs in a refractory furnace in the presence of atmospheric oxygen. The rate of heating was maintained at 4° C./min. The heated mixture was then cooled to 50° C., ground in a ball mill to reduce its particle size to 45 microns. The obtained colorant had L a* b* values of 70.24, –2.06 and 0.16 respectively on the CIE scale.

EXAMPLE 8

0.7 g of mixed rare earth carbonate was mixed with 2.2 g of zinc sulfate and 0.24 g of nickel sulfate, and the resultant mixture was dissolved in sulfuric acid, to achieve a homogeneous mixture. This mixture was then heated at 600° C., cooled and then sintered. The sintered mass was then heated to 650° C. for 2 hrs in a refractory furnace in the presence of atmospheric oxygen. The rate of heating was maintained at 20° C./min. The heated mixture was then cooled to 150° C., ground in a ball mill to reduce its particle size to 100 microns. The obtained colorant had an greenish-yellow color.

EXAMPLE 9

0.7 g of mixed rare earth carbonate was mixed with 2.2 g of zinc sulfate and 0.24 g of nickel sulfate, and the resultant mixture was dissolved in sulfuric acid, to achieve a homogeneous mixture. This mixture was then heated at 600° C., cooled and then sintered. The sintered mass was then heated to 1300° C. for 2 hrs in a refractory furnace in the presence of atmospheric oxygen. The rate of heating was maintained at 20° C./min. The heated mixture was then cooled to 40° C., ground in a ball mill to reduce its particle size to 2 microns. The obtained colorant had an yellowish-brown color.

EXAMPLE 10

1.5 g of mixed rare earth carbonate was mixed with 2.2 g of stannous chloride and 0.48 g of nickel sulfate, and the resultant mixture was dissolved in nitric acid, to achieve a homogeneous mixture. This mixture was then heated at 1600° C. for 2 hrs in a refractory furnace in the presence of atmospheric oxygen. The rate of heating was maintained at 3° C./min. The heated mixture was then cooled to 40° C., ground in a ball mill to reduce its particle size to 10 microns. The obtained colorant had an yellowish-brown color.

EXAMPLE 11

0.15 g of mixed rare earth carbonate was mixed with 3.2 g of aluminium sulfate and 0.32 g of chromium sulfate, and the resultant mixture ground to achieve a homogeneous mixture. This mixture was then heated at 1250° C. for 2 hrs in a refractory furnace in the presence of atmospheric oxygen. The rate of heating was maintained at 14° C./min. The heated mixture was then cooled to 40° C., ground in a ball mill to reduce its particle size to 10 microns. The obtained colorant had whitish pink color.

EXAMPLE 12

0.15 g of mixed rare earth carbonate was mixed with 3.2 g of aluminium sulfate and 0.21 g of cobaltous acetate, and the resultant mixture ground to achieve a homogeneous mixture. This mixture was then heated at 1250° C. for 2 hrs in a refractory furnace in the presence of atmospheric oxygen. The rate of heating was maintained at 14° C./min.

The heated mixture was then cooled to 40° C., ground in a ball mill to reduce its particle size to 10 microns. The obtained colorant had light blue color.

EXAMPLE 13

0.15 g of mixed rare earth carbonate was mixed with 3.2 g of aluminium sulfate and 0.21 g of manganous sulfate, and the resultant mixture ground to achieve a homogeneous mixture. This mixture was then heated at 1250° C. for 2 hrs in a refractory furnace in the presence of atmospheric oxygen. The rate of heating was maintained at 14° C./min. The heated mixture was then cooled to 40° C., ground in a ball mill to reduce its particle size to 10 microns. The obtained colorant had light brown color.

EXAMPLE 14

0.15 g of mixed rare earth carbonate was mixed with 3.4 g of aluminium sulfate, 0.2 g of copper sulfate, 0.05 g of cobaltous acetate and 0.02 g of sodium fluoride was mixture ground to achieve a homogeneous mixture. This mixture was then heated at 1250° C. for 2 hrs in a refractory furnace in the presence of atmospheric oxygen. The rate of heating was maintained at 11° C./min. The heated mixture was then cooled to 40° C., ground in a ball mill to reduce its particle size to 50 microns. The obtained colorant had a dark blue color.

EXAMPLE 15

0.15 g of mixed rare earth fluoride was mixed with 3.4 g of aluminium sulfate and 0.2 g of copper sulfate and 0.05 g of cobaltous acetate, and the resultant mixture ground to achieve a homogeneous mixture. This mixture was then heated at 1450° C. for 6 hrs in a refractory furnace in the presence of atmospheric oxygen. The rate of heating was maintained at 7° C./min. The heated mixture was then cooled to 90° C., ground in a ball mill to reduce its particle size to 100 microns. The obtained colorant had a dark blue color.

EXAMPLE 16

0.15 g of mixed rare earth fluoride was mixed with 3.4 g of aluminium sulfate and 0.2 g of copper sulfate and 0.05 g of cobaltous acetate, and the resultant mixture ground to achieve a homogeneous mixture. This mixture was then heated at 1450° C. for 30 min in a refractory furnace in the presence of atmospheric oxygen. The rate of heating was maintained at 7° C./min. The heated mixture was then cooled to 40° C., ground in an attrition mill to reduce its particle size to 40 microns. The obtained colorant had a blue color.

EXAMPLE 17

1.0 g of mixed rare earth fluoride was mixed with 0.1 g of barium carbonate, and the resultant mixture ground to achieve a homogeneous mixture. This mixture was then heated at 1000° C. for 30 min in a refractory furnace in the presence of atmospheric oxygen. The rate of heating was maintained at 2° C./min. The heated mixture was then cooled to 40° C., ground in a ball mill to reduce its particle size to 100 microns. The obtained colorant had a brown color.

EXAMPLE 18

2.0 g of mixed rare earth carbonate was mixed with 2.4 g of bismuth nitrate, 8 g of ethylene diamine tetraacetic acid (sodium salt) and 3 g of vanadyl sulfate in 100 ml of water. The resultant solution was then heated to evaporation and then treated at 1800° C. for 3 hrs in a refractory furnace in the presence of atmospheric oxygen. The rate of heating was maintained at 2° C./min. The heated mixture was then cooled to 40° C., ground in a ball mill to reduce its particle size to 5 microns. The obtained colorant had a yellowish brown color.

EXAMPLE 19

1.0 g of mixed rare earth chloride was mixed with 0.1 g of bismuth nitrate in 100 ml of water. The resultant solution was then heated to evaporation and then treated at 1200° C. for 2 hrs in a refractory furnace in the presence of atmospheric oxygen. The rate of heating was maintained at 2° C./min. The heated mixture was then cooled to 60° C., ground in a ball mill to reduce its particle size to 20 microns. The obtained colorant had a dark brown color.

EXAMPLE 20

0.15 g of mixed rare earth chloride was mixed with 0.2 g of copper sulfate, 3.3 g of aluminium sulfate, 0.05 g of cobaltous acetate and the resultant mixture ground to achieve a homogeneous mixture. This mixture was then heated at 1350° C. for 90 min in a refractory furnace in the presence of atmospheric oxygen. The rate of heating was maintained at 5° C./min. The heated mixture was then cooled to 40° C., ground in a ball mill to reduce its particle size to 60 microns. The obtained colorant had a blue color.

EXAMPLE 21

0.70 g of mixed rare earth nitrate was mixed with 0.24 g of nickel carbonate and 2.2 g of zinc sulfate and the resultant mixture ground to achieve a homogeneous mixture. This mixture was then heated at 1200° C. for 90 min in a refractory furnace in the presence of atmospheric oxygen. The rate of heating was maintained at 10° C./min. The heated mixture was then cooled to 40° C., ground in a ball mill to reduce its particle size to 10 microns. The obtained colorant had a green color.

EXAMPLE 22

0.15 g of mixed rare earth chloride was mixed with 3.4 g of aluminium sulfate, 0.2 g of copper sulfate, 0.05 g of cobaltous acetate and 0.02 g of sodium chloride. The mixture was ground to achieve a homogenity. This mixture was then heated at 1250° C. for 2 hrs in a refractory furnace in the presence of atmospheric oxygen. The rate of heating was maintained at 11° C./min. The heated mixture was then cooled to 40° C., ground in a ball mill to reduce its particle size to 5 microns. The obtained colorant had a dark greenish-blue color.

EXAMPLE 23

1 g of mixed rare earth carbonate was mixed with 0.3 g of titanium oxide taken in a mortar and ground using a pestle. The homogeneous mixture is then heated at a rate of 3° C./min to a temperature of 1500° C. for 4 hrs in a refractory furnace in the presence of atmospheric oxygen. The heated mixture is then cooled to 35° C., ground to particle size of 10 microns in a gyratory mill to obtain brown colored inorganic colorants. The obtained colorant had L a* b* values of 65.39, 20.91 and 23.06 respectively on the CIE scale.

Comparative Data with Conventional Process

Conventional colorants based on rare earths employ individual elements like cerium, praseodymium, neodymium etc as their chlorides, sulfates or oxides. As the separation of rare earth elements are difficult due to similarities in charge and properties, the final cost of cerium carbonate is Rs 625/kg, praseodymium oxide Rs 6470/kg and neodymium oxide Rs 3450/kg. When this conventional method is replaced by the use of mixed rare earth carbonates, the cost of the mixed rare earth carbonate is only Rs 60/kg. This thereby provides a direct reduction of 10-100 times in the cost of the raw material alone.

Characteristics of the Product

The prepared colorant by suitable doping of mixed rare earth carbonate can generate colors with similar L a b values on the CIE scale. For instance the L a b values of the colorant in example 23 has a similar L a b value as that of a colorant having the fixed composition of $Ce_{0.70}Pr_{0.05}La_{0.25}O_{1.875}$, which has been prepared by independent mixing of cerium oxide, praseodymium oxide, and lanthanum oxide (L a b values of 65.43, 20.78 and 23.87 respectively). The covering properties of these colorants are similar.

Advantages

The following are the advantages of the present invention:
1. This process provides a route to the preparation of inorganic colorants of varying hues and colors by the use of mixed rare earth compounds, thereby obviating the need for separation of the individual rare earth elements
2. This process makes use of a mixed rare earth compound, which therefore reduces the cost of preparation of the colorant by 10-100 times
3. This process depends on mixed rare earth compounds, which are environmentally safe than the conventional colorants based on mercury, lead, cadmium etc.

We claim:

1. A process for preparation of inorganic colourants from mixed rare earth compounds, which comprises
   (i) homogenising mixed rare earth compounds selected from one or more of oxide, carbonate, nitrate, fluoride, chloride of rare earth elements having atomic number in the range of 57 to 71 and having a composition of at least cerium in the range of 40-45% w/w, praseodymium in the range of 4-6% w/w, lanthanum in the range of 15-25%, neodymium in the range of 15-20% and other rare earths to a maximum of 5%, optionally mixed with not more than 40 times by weight of a compound of a metal ion selected from the group consisting of transition metal series, lanthanide/actinide series, group(III) or group(IV) of the periodic table, and/or not more than 0.2 times by weight of neutral salt either in liquid phase or solid state to obtain a homogenate;
   (ii) heating the homogenate obtained in step (i), followed by cooling and subsequent reduction of particle size of the resulting product to obtain inorganic colourants.

2. A process as claimed in claim 1, wherein the homogenate is heated in step (ii) to a temperature in the range of 600-1800° C. for a period of 10-600 minutes either continuously or with intermittent sintering.

3. A process as claimed in claim 1, wherein the cooling in step (ii) is carried out to a temperature in the range of 35-150° C.

4. A process as claimed in claim 1, wherein the particle size in step (ii) is reduced to not more than 100 microns.

5. A process as claimed in claim 1, wherein said other rare earth element is selected from the group consisting of, samarium, neodymium, terbium and any combination thereof.

6. A process as claimed in claim 1, wherein the metal is selected from the group consisting of nickel, cobalt, titanium, zirconium, aluminum, silicon, germanium, thalium and any combination thereof.

7. A process as claimed in claim 1, wherein the neutral salt used is selected from the group consisting of chloride, fluoride, phosphate and sulfate salts of sodium either individually or in any combination thereof.

8. A process as claimed in claim 1, wherein the reduction of particle size is effected using a ball mill, grinder, crusher, attrition mill or mortar and pestle.

* * * * *